United States Patent
Zarakas et al.

(10) Patent No.: US 11,615,400 B2
(45) Date of Patent: Mar. 28, 2023

(54) TOKENIZING A PRIMARY ACCOUNT NUMBER PRIOR TO TRANSMISSION TO A TERMINAL

(71) Applicant: Capital One Services, LLC, McLean, VA (US)

(72) Inventors: James Zarakas, Centreville, VA (US); Tyler Locke, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/590,034

(22) Filed: Feb. 1, 2022

(65) Prior Publication Data

US 2022/0156722 A1    May 19, 2022

Related U.S. Application Data

(63) Continuation of application No. 17/302,321, filed on Apr. 30, 2021, now Pat. No. 11,244,305, which is a continuation of application No. 16/824,935, filed on Mar. 20, 2020, now Pat. No. 10,997,591, which is a continuation of application No. 16/601,932, filed on Oct. 15, 2019, now Pat. No. 10,600,051, which is a continuation of application No. 16/376,562, filed on Apr. 5, 2019, now Pat. No. 10,496,984, which is a continuation of application No. 16/162,094, filed on Oct. 16, 2018, now Pat. No. 10,296,901.

(51) Int. Cl.
| | |
|---|---|
| G06Q 20/36 | (2012.01) |
| G06Q 20/38 | (2012.01) |
| G06Q 20/34 | (2012.01) |
| G06Q 20/02 | (2012.01) |
| G06Q 20/40 | (2012.01) |
| G06Q 20/20 | (2012.01) |

(52) U.S. Cl.
CPC ......... *G06Q 20/3672* (2013.01); *G06Q 20/02* (2013.01); *G06Q 20/202* (2013.01); *G06Q 20/204* (2013.01); *G06Q 20/341* (2013.01); *G06Q 20/352* (2013.01); *G06Q 20/385* (2013.01); *G06Q 20/3821* (2013.01); *G06Q 20/38215* (2013.01); *G06Q 20/401* (2013.01)

(58) Field of Classification Search
CPC .......... G06Q 20/3672; G06Q 20/3821; G06Q 20/385
USPC ...................................................... 235/492
See application file for complete search history.

(56) References Cited

U.S. PATENT DOCUMENTS

| | | |
|---|---|---|
| 8,151,345 B1 | 4/2012 | Yeager |
| 10,296,901 B1 | 5/2019 | Zarakas et al. |
| 10,496,984 B1 | 12/2019 | Zarakas et al. |

(Continued)

OTHER PUBLICATIONS

Malcomvetter T., "Breaking Credit Card Tokenization—Part 1", https://www.optiv.com/blog/breaking-credit-card-tokenization-part-1, Dec. 9, 2015, 1 page.

(Continued)

*Primary Examiner* — Toan C Ly
(74) *Attorney, Agent, or Firm* — Harrity & Harrity, LLP

(57) ABSTRACT

In some implementations, a transaction card may receive transaction data from a transaction terminal based on initiation of a transaction with the transaction terminal; generate a tokenized primary account number, for use with the transaction, based on the transaction data and an actual primary account number of the transaction card; and transmit the tokenized primary account number to the transaction terminal for processing the transaction.

20 Claims, 6 Drawing Sheets

(56) References Cited

U.S. PATENT DOCUMENTS

| | | |
|---|---|---|
| 10,600,051 B1 | 3/2020 | Zarakas et al. |
| 10,997,591 B2 | 5/2021 | Zarakas et al. |
| 11,244,305 B2 | 2/2022 | Zarakas et al. |
| 2012/0039469 A1 | 2/2012 | Von Mueller et al. |
| 2014/0074637 A1 | 3/2014 | Hammad |
| 2015/0073983 A1 | 3/2015 | Bartenstein et al. |
| 2018/0005227 A1 | 1/2018 | Sandelov et al. |
| 2019/0034912 A1 | 1/2019 | Wilson |
| 2019/0043045 A1 | 2/2019 | Wilson |

OTHER PUBLICATIONS

Riesen M., "What is Tokenization and How Can I Use it for PCI DSS Compliance?," https://www.securitymetrics.com/blog/what-tokenization-and-how-can-i-use-it-pci-dss-compliance, Feb. 24, 2016, 2 pages.

Square, Inc., "Payment Tokenization Explained," https://squareup.com/townsquare/what-does-tokenization-actually-mean, Apr. 26, 2016, 8 pages.

Wikipedia, "Tokenization (Data Security)", https://en.wikipedia.org/wiki/Tokenizations_(data_security), Oct. 11, 2018, 7 pages.

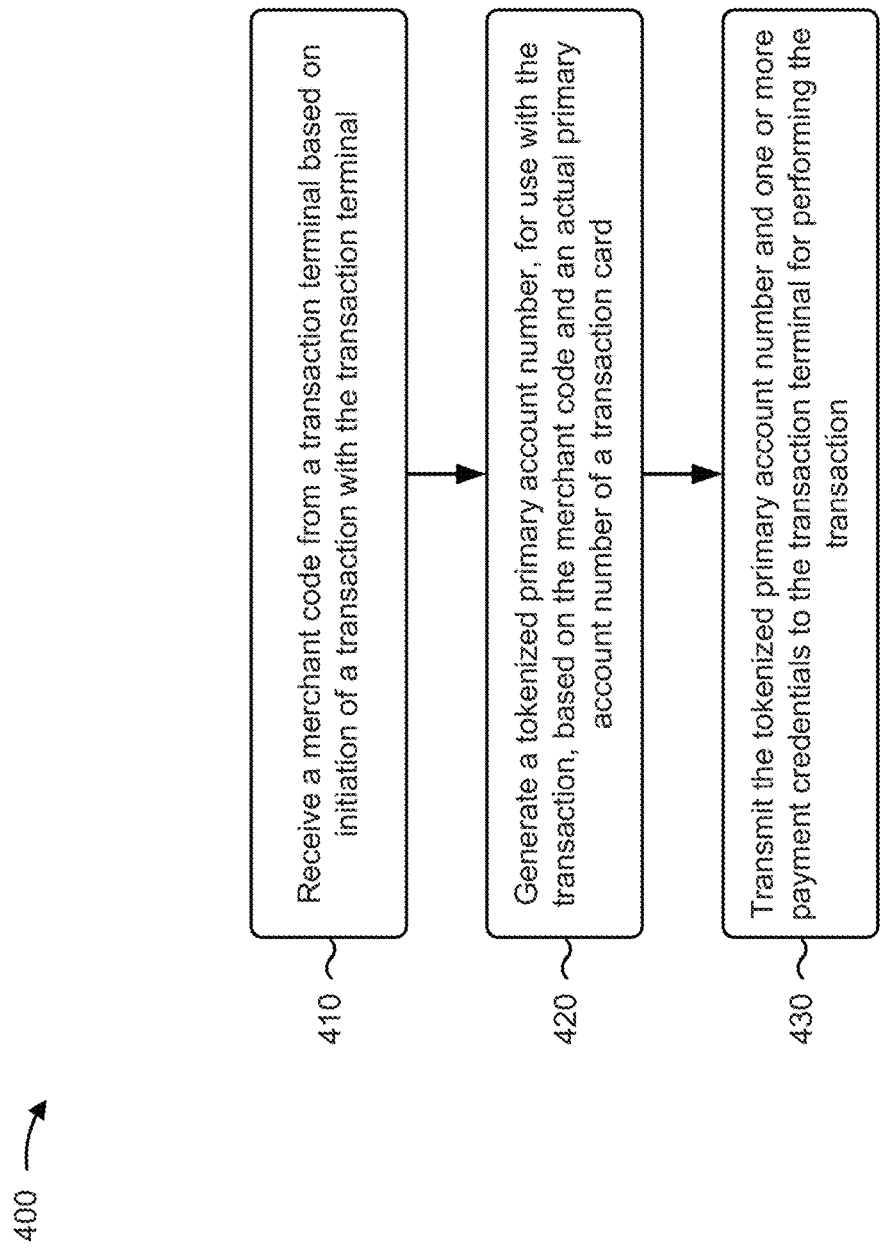

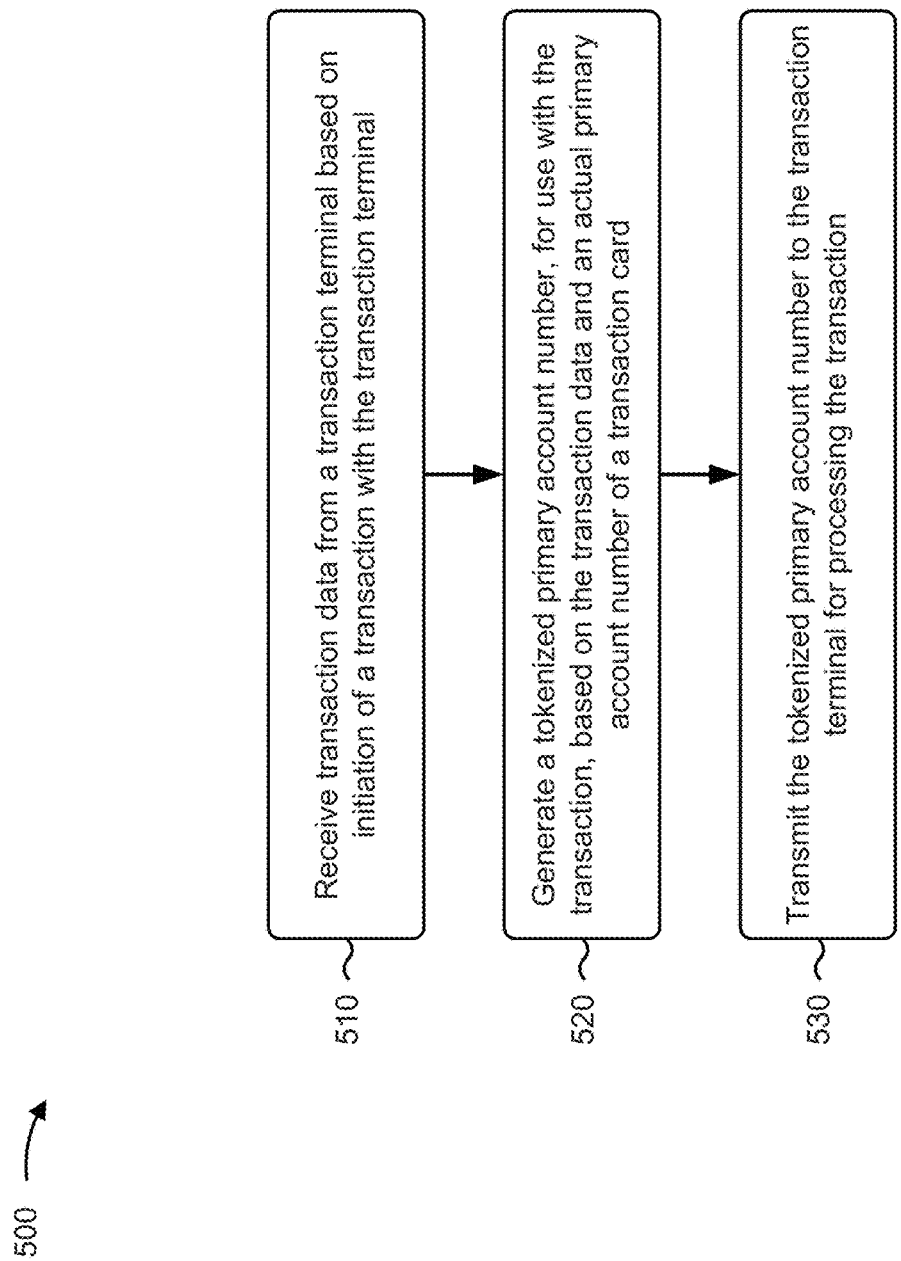

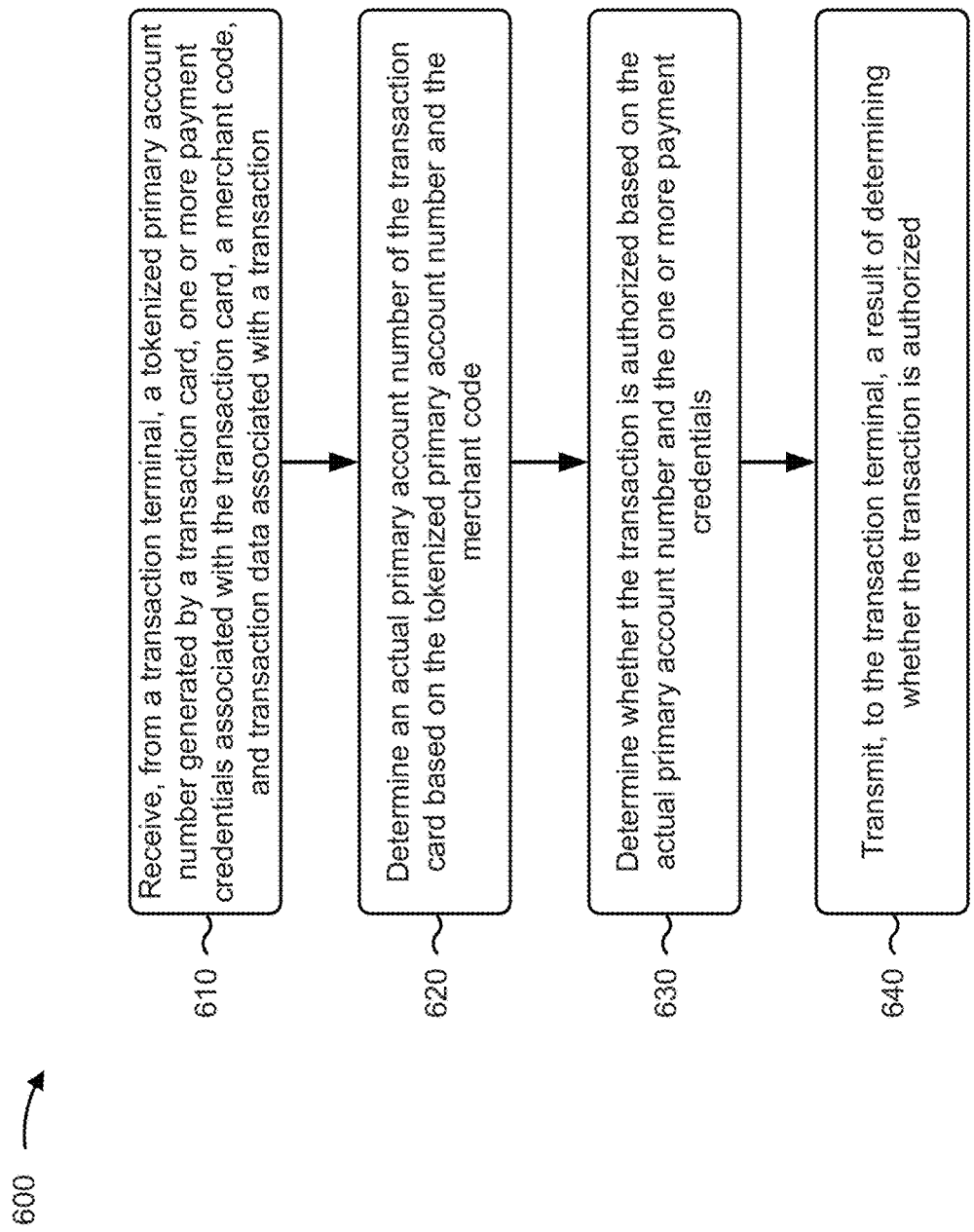

TOKENIZING A PRIMARY ACCOUNT NUMBER PRIOR TO TRANSMISSION TO A TERMINAL

RELATED APPLICATIONS

This application is a continuation of U.S. patent application Ser. No. 17/302,321, filed Apr. 30, 2021 (now U.S. Pat. No. 11,244,305), which is a continuation of U.S. patent application Ser. No. 16/824,935, filed Mar. 20, 2020 (now U.S. Pat. No. 10,997,591), which is a continuation of U.S. patent application Ser. No. 16/601,932, filed Oct. 15, 2019 (now U.S. Pat. No. 10,600,051), which is a continuation of U.S. patent application Ser. No. 16/376,562, filed Apr. 5, 2019 (now U.S. Pat. No. 10,496,984), which is a continuation of U.S. patent application Ser. No. 16/162,094, filed Oct. 16, 2018 (now U.S. Pat. No. 10,296,901), which are incorporated herein by reference in their entireties.

BACKGROUND

Tokenization, when applied to data security, may refer to the process of substituting a sensitive data element with a non-sensitive equivalent, referred to as a token, that has no extrinsic or exploitable meaning or value. The token acts as a reference that maps back to the sensitive data through a tokenization system. The mapping from original data to a token uses methods which render tokens infeasible to reverse in the absence of the tokenization system, such as by using tokens created from random numbers.

SUMMARY

According to some possible implementations, a transaction card may include memory and one or more processors communicatively coupled to the memory. The one or more processors may be configured to receive a merchant code from a transaction terminal based on initiation of a transaction with the transaction terminal; generate a tokenized primary account number, for use with the transaction, based on the merchant code and an actual primary account number of the transaction card; and transmit the tokenized primary account number and one or more payment credentials to the transaction terminal for performing the transaction.

According to some possible implementations, a method, performed by a transaction card, may include receiving transaction data from a transaction terminal based on initiation of a transaction with the transaction terminal; generating a tokenized primary account number, for use with the transaction, based on the transaction data and an actual primary account number of the transaction card; and transmitting the tokenized primary account number to the transaction terminal for processing the transaction.

According to some possible implementations, a transaction processing system may include one or more memories and one or more processors communicatively coupled to the one or more memories. The one or more processors may be configured to receive, from a transaction terminal, a tokenized primary account number generated by a transaction card, one or more payment credentials associated with the transaction card, a merchant code, and transaction data associated with a transaction; determine an actual primary account number of the transaction card based on the tokenized primary account number and the merchant code; determine whether the transaction is authorized based on the actual primary account number and the one or more payment credentials; and transmit, to the transaction terminal, a result of determining whether the transaction is authorized.

BRIEF DESCRIPTION OF THE DRAWINGS

FIGS. 4-6 are flow charts of example processes relating to tokenizing a primary account number prior to transmission to a terminal.

DETAILED DESCRIPTION

The following detailed description of example implementations refers to the accompanying drawings. The same reference numbers in different drawings may identify the same or similar elements.

A primary account number (PAN) may refer to an identifier (e.g., a 14 to 16 digit numerical code, number, or sequence of characters) that identifies a transaction card account (e.g., a credit card account, a debit card account, and/or the like) of an account holder. In some cases, the first six digits of the PAN may identify a transaction card network and/or a transaction card issuer, the next set of unique digits may identify the account holder's account, and the last digit may be used for additional fraud security. The PAN may uniquely identify an account of a transaction cardholder. If a PAN is obtained by a malicious user, the PAN may be used to commit transaction card fraud (e.g., by charging transaction to the cardholder's account without knowledge by and/or authorization of the cardholder).

To reduce transaction card fraud, the PAN may be tokenized to obfuscate the actual PAN of a transaction card by replacing the actual PAN with an algorithmically generated tokenized PAN (e.g., a token). The tokenized PAN may be used in association with the transaction to prevent a malicious user from obtaining the actual PAN. For example, the actual PAN may be tokenized for storage in a database (e.g., a merchant database, a card issuer database, a data vault, a token vault, and/or the like). As a particular example, when a transaction card is used at a transaction terminal (e.g., by swiping the card, inserting the card, and/or the like), the transaction terminal may transmit the actual PAN to a card tokenization system, which may tokenize the actual PAN to generate a tokenized PAN, and may store the tokenized PAN and/or transmit the tokenized PAN back to the transaction terminal. However, in this scenario, the transaction terminal still obtains the actual PAN at the beginning of the transaction. As a result, a malicious user may obtain the actual PAN from the transaction terminal (e.g., using malware and/or malicious software on the transaction terminal, and/or the like), and may commit transaction card fraud using the actual PAN.

Some techniques and apparatuses described herein permit an actual PAN of a transaction card to be tokenized by the transaction card. The transaction card may then transmit a tokenized PAN, rather than the actual PAN, to a transaction terminal. Thus, the transaction terminal may never receive the actual PAN, thereby improving security and reducing the likelihood of transaction card fraud. For example, a malicious user may only be able to obtain tokenized PANs, and not actual PANs, from a transaction terminal. Additional details are described below.

Figure 1:
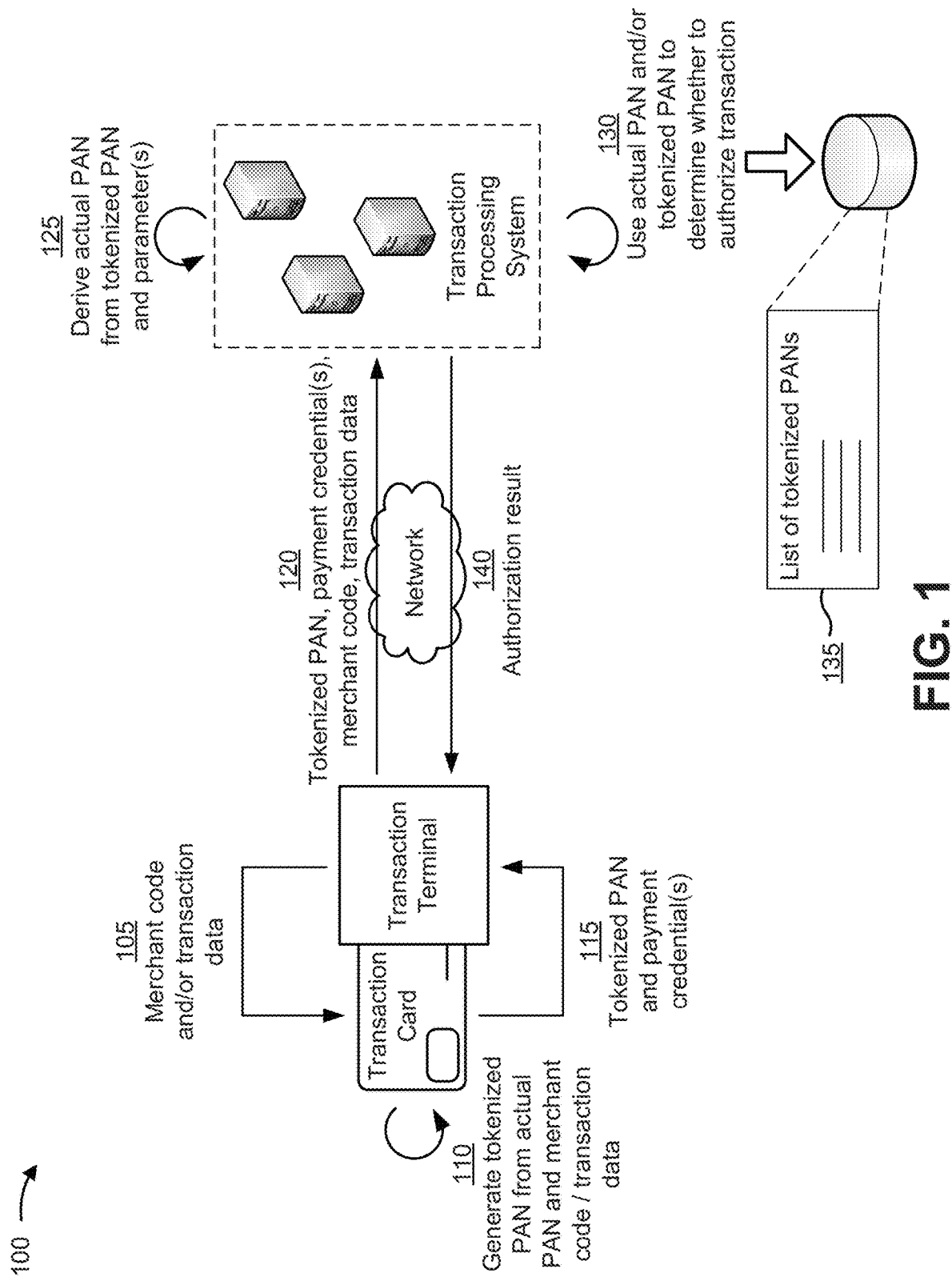
FIG. 1 is a diagram of an example implementation described herein.

FIG. 1 is a diagram of an example implementation 100 described herein. As shown in FIG. 1, a transaction may be initiated by establishing communication and/or communicating information between a transaction card and a transaction terminal. For example, as shown, the transaction card may be inserted into the transaction terminal. Alternatively, the transaction card may be swiped at the transaction terminal, may be brought into communicative proximity of the transaction terminal (e.g., using near-field communication (NFC) and/or the like), and/or the like. Additional details regarding the transaction card and the transaction terminal are described below in connection with FIG. 2.

As shown by reference number 105, the transaction terminal may transmit a merchant code and/or transaction data to the transaction card (e.g., after the transaction has been initiated). The transaction data may include, for example, the merchant code, a transaction amount, a transaction date, a transaction time, a transaction location, and/or the like. The merchant code may identify a merchant associated with the transaction (e.g., a seller, a retailer, a company, a business, an organization, and/or the like).

As shown by reference number 110, the transaction card may generate a tokenized PAN using an actual PAN of the transaction card and transaction data. For example, in some implementations, the transaction card may generate the tokenized PAN using the actual PAN and the merchant code. In some implementations, the transaction card may generate the tokenized PAN using the actual PAN and transaction data other than the merchant code. In some implementations, the transaction card may generate the tokenized PAN using the actual PAN, the merchant code, and additional transaction data (e.g., a transaction amount, a transaction date, a transaction time, a transaction location, and/or the like). The actual PAN may be a unique identifier that uniquely identifies an account associated with the transaction card (e.g., a cardholder account and/or the like). In some implementations, the actual PAN may be a 14 digit number, a 15 digit number, a 16 digit number, and/or the like.

In some implementations, the tokenized PAN may be generated to have the same format as the actual PAN (e.g., using a same number of digits). In some implementations, the tokenized PAN may be generated to have a different format than the actual PAN, and may include numbers, letters, symbols, and/or the like. In some implementations, the tokenized PAN may tokenize the entire actual PAN (e.g., all digits of the actual PAN). In some implementations, the tokenized PAN may be generated to tokenize a portion of the actual PAN (e.g., a subset of digits of the actual PAN). Tokenization may use one or more tokenization algorithms and/or tokenization techniques, which may use random number generation, pseudo-random number generation, and/or the like, to generate a tokenized PAN from which the actual PAN cannot be reverse engineered without prior knowledge of the tokenization algorithm and/or technique and the parameters used as input to such tokenization algorithm and/or technique.

Additionally, or alternatively, the transaction card may generate the tokenized PAN using one or more payment credentials. A payment credential may include, for example, an expiration date associated with the transaction card (e.g., a month and/or year of expiration, and/or the like), a card security code associated with the transaction card (e.g., a card verification value (CVV), a CVV2, a card verification code (CVC), CVC2, a card identifier (CID), and/or the like), a cardholder name associated with the transaction card, a billing postal code associated with the transaction card (e.g., a ZIP code and/or the like), one or more fields of a billing address associated with the transaction card (e.g., a physical address, a post office box, a street number, a street name, a city, a state, a geographic region, and/or the like), a personal identification number (PIN) associated with the transaction card, and/or the like.

In some implementations, the transaction card (e.g., a combination of hardware included in the transaction card and software executing on the transaction card) may perform tokenization (e.g., a tokenization process, a tokenization algorithm, and/or the like) to generate the tokenized PAN. For example, the transaction card (e.g., one or more processors included in the transaction card) may receive the actual PAN (e.g., from secure storage included in the transaction card) and one or more parameters to be used as input for tokenization. The one or more parameters may include one or more payment credentials (as described above), information included in transaction data received from the transaction terminal (as described above), a random seed (e.g., randomly selected from a set of possible seeds), and/or the like. The transaction card may perform tokenization to modify some or all digits (and/or characters) of the actual PAN in a particular manner, depending on the one or more parameters, to generate the digits and/or characters of the tokenized PAN.

In some implementations, the transaction card may use a different parameter and/or combination of parameters to perform tokenization based on one or more tokenization factors, such as a time of the transaction, a day of the week on which the transaction is performed, a date of the transaction, a merchant associated with the transaction, a cardholder associated with the transaction, a terminal identifier of the transaction terminal, and/or the like. In some implementations, the one or more tokenization factors may be communicated to the transaction terminal and/or the transaction processing system, so that the transaction processing system can detokenize the tokenized PAN to obtain the actual PAN. In this way, security may be further improved.

In some implementations, the tokenized PAN may be a single-use tokenized PAN. In this case, and as described in more detail below, a transaction processing system may decline the transaction if the tokenized PAN has been previously used (has ever been used), and/or if the tokenized PAN has been previously used within a threshold time period (e.g., one hour, one week, one month, one year, two years, and/or the like). In this case, the transaction card may generate the tokenized PAN using information that may differ across different transactions (e.g., for the same merchant and same transaction card). For example, the transaction card may generate the tokenized PAN using a transaction amount, a transaction date, a transaction time, a transaction location, and/or the like. Additionally, or alternatively, in this case, the transaction card may generate the tokenized PAN using information that does not differ across different transactions (e.g., for the same merchant and same transaction card), such as one or more payment credentials, a merchant code, and/or the like.

In some implementations, the tokenized PAN may be a multi-use tokenized PAN that may be used multiple times in connection with the same merchant. In this case, and as described in more detail below, a transaction processing system may decline the transaction if the tokenized PAN has been previously used for a transaction with a different merchant (e.g., associated with a different transaction code). In this case, the transaction card may generate the tokenized PAN using only information that does not differ across different transactions (e.g., for the same merchant and same transaction card). For example, the transaction card may generate the tokenized PAN using information other than a transaction amount, a transaction date, a transaction time, a transaction location, and/or the like. For example, the transaction card may generate the tokenized PAN using one or more payment credentials, a merchant code, and/or the like, which do not differ across different transactions associated with the same merchant and same transaction card.

In some implementations, the transaction card may generate multiple tokenized PANs, and may transmit the multiple tokenized PANs to the transaction terminal for processing the transaction (as described in more detail below). In some implementations, the transaction card may use different sets of parameters to generate different tokenized PANs, of the multiple tokenized PANs, from the actual PAN. For example, the transaction card may generate both a single-use tokenized PAN (as described above) and a multi-use tokenized PAN (e.g., for multiple uses with a specific merchant, as described above) based on the actual PAN. In this case, a first tokenized PAN (e.g., a single-use tokenized PAN) may be generated using a first set of parameters (e.g., one or more first parameters), and a second tokenized PAN (e.g., a multi-use tokenized PAN) may be generated using a second set of parameters (e.g., one or more second parameters). In some implementations, the first set of parameters may change across transactions, and the second set of parameters may not change across transactions (e.g., with the same merchant). Additionally, or alternatively, the transaction card may combine the first tokenized PAN and the second tokenized PAN to generate a combined tokenized PAN, which may be transmitted to the transaction terminal for processing the transaction. In this way, security may be further improved.

As shown by reference number 115, the transaction card may transmit the tokenized PAN to the transaction terminal. Additionally, or alternatively, the transaction card may transmit one or more payment credentials to the transaction terminal (e.g., one or more payment credentials described above). For example, the transaction card may transmit the tokenized PAN and payment credential(s) to the transaction terminal after a user has interacted with the transaction terminal to approve the transaction (e.g., to approve the transaction amount, submit a signature, and/or the like).

As shown by reference number 120, the transaction terminal may transmit the tokenized PAN, the payment credential(s), and/or the transaction data (e.g., including the merchant code) to a transaction processing system. The transaction processing system may process, authorize, and/or authenticate the transaction using the tokenized PAN and other information received from the transaction terminal. In this way, the transaction terminal never has access to the actual PAN. Additional details regarding the transaction processing system are described below in connection with FIG. 2.

As shown by reference number 125, the transaction processing system may derive the actual PAN from the tokenized PAN and one or more parameters received from the transaction terminal. The one or more parameters may include, for example, transaction data (e.g., a merchant code, a transaction amount, a transaction date, a transaction time, a transaction location, and/or the like), one or more payment credentials, and/or the like.

In some implementations, the transaction processing system (e.g., a combination of hardware included in the transaction card and software executing on the transaction card) may perform detokenization (e.g., a detokenization process, a detokenization algorithm, and/or the like) to determine the actual PAN from the tokenized PAN. For example, the transaction processing system (e.g., one or more processors included in the transaction processing system) may receive the tokenized PAN and one or more parameters to be used as input for detokenization. The one or more parameters may include one or more payment credentials (as described above), information included in transaction data received from the transaction terminal (as described above), a random seed (e.g., randomly selected from a set of possible seeds), and/or the like. The transaction processing system may perform detokenization to modify some or all digits and/or characters of the tokenized PAN in a particular manner, depending on the one or more parameters, to generate the digits (and/or characters) of the actual PAN.

As shown by reference number 130, the transaction processing system may determine whether to authorize the transaction based on the actual PAN, the tokenized PAN, and/or one or more payment credentials. For example, the transaction processing system may verify the actual PAN and the one or more payment credentials to determine whether to authorize the transaction. In some implementations, the transaction processing system may perform one or more techniques to check for transaction card fraud using the actual PAN, the one or more payment credentials, and/or the transaction data.

Additionally, or alternatively, as shown by reference number 135, the transaction processing system may determine whether to authorize the transaction based on the tokenized PAN. For example, the transaction processing system may compare the tokenized PAN to a list of tokenized PANs stored in memory (e.g., a data structure, a database, and/or the like). The list of tokenized PANs may include a list of tokenized PANs that have previously been used for a transaction. For example, when the transaction processing system receives a tokenized PAN, the transaction processing system may store the tokenized PAN in memory. In some implementations, the transaction processing system may store the tokenized PAN in memory in association with a merchant code associated with a transaction for which the tokenized PAN is used. In some implementations, where the transaction processing system receives multiple tokenized PANs, the transaction processing system may compare all of the tokenized PANs to the list of PANs stored in memory. If all of the tokenized PANS are successfully authenticated (e.g., as described herein), then the transaction processing system may approve the transaction. However, if one of the tokenized PANs fails authentication, then the transaction processing system may decline the transaction.

In some implementations, a tokenized PAN may be a single-use tokenized PAN. In this case, the transaction processing system may receive the tokenized PAN from the transaction terminal, and may perform a lookup to determine whether the tokenized PAN is stored in the list. If the tokenized PAN is stored in the list, indicating that the tokenized PAN has already been used for a transaction, then the transaction processing system may decline the transaction. Additionally, or alternatively, the transaction processing system may transmit a notification that the tokenized PAN has already been used (e.g., to a merchant device, a merchant email address, a cardholder device, a cardholder email address, and/or the like) to provide an alert of potential transaction card fraud. If the tokenized PAN is not stored in the list, then the transaction processing system may approve the transaction, and may store the tokenized PAN in the list.

In some implementations, a single-use tokenized PAN may be single-use for a threshold time period, so that tokenized PANs may eventually be re-used. In this case, the transaction processing system may determine whether the tokenized PAN has been previously used within a threshold time period (e.g., one hour, one week, one month, six months, one year, and/or the like). In this case, when the transaction processing system receives a tokenized PAN from the transaction terminal, the transaction processing system may store information that identifies when the tokenized PAN was used (e.g., a time at which the tokenized PAN was transmitted, received, and/or stored, a transaction time indicated in transaction data, and/or the like). Additionally, or alternatively, the transaction processing system may delete tokenized PANs from the list after the threshold time period has elapsed (so that if the tokenized PAN is reused after the threshold time period, a matching tokenized PAN will not be stored in the list, and the transaction will be approved).

In some implementations, a tokenized PAN may be a multi-use tokenized PAN permitted to be used multiple times across different transactions with the same merchant. In this case, the transaction processing system may receive the tokenized PAN and a first merchant code from the transaction terminal, and may perform a lookup to determine whether the tokenized PAN is stored in the list in association with a second (e.g., different) merchant code. If the tokenized PAN is stored in the list in association with the second merchant code, indicating that the tokenized PAN has previously been used for a transaction with a different merchant, then the transaction processing system may decline the transaction. Additionally, or alternatively, the transaction processing system may transmit a notification that the tokenized PAN has previously been used for a transaction with a different merchant (e.g., to a first merchant device, a first merchant email address, a second merchant device, a second merchant email address, a cardholder device, a cardholder email address, and/or the like) to provide an alert of potential transaction card fraud. If the tokenized PAN is not stored in the list in associated with a second merchant code (e.g., is not stored in the list, or is stored in the list in association with the first merchant code), then the transaction processing system may approve the transaction, and may store the tokenized PAN in the list in association with the first merchant code (e.g., if the tokenized PAN is not already stored in the list in association with the first merchant code).

In some implementations, if the transaction is denied, the transaction processing system may determine a location of the transaction card, and may provide information that identifies the location to a user device (e.g., a smart phone, a tablet, and/or the like) of a cardholder, to a user device associated with an authority (e.g., a police officer, a police station, and/or the like), and/or the like. In some implementations, the location may be provided via a text message, an email, a phone call, and/or the like. Additionally, or alternatively, the transaction processing system may instruct the transaction card to broadcast the location. Additionally, or alternatively, the transaction processing system may flag the actual PAN and/or the tokenized PAN (e.g., by storing an indication in memory) for future transactions.

As shown by reference number 140, the transaction processing system may transmit an authorization result to the transaction terminal. The authorization result may be a result of determining whether to authorize the transaction, and may be an indication to approve the transaction or an indication to decline the transaction, as described above. Based on the authorization result, the transaction terminal may output an indication of whether the transaction is approved or declined, and may complete the transaction if the transaction is approved. In some implementations, the transaction processing system may determine whether to approve or deny the transaction solely based on the tokenized PAN. Additionally, or alternatively, the transaction processing system may determine whether to approve or deny the transaction based on the tokenized PAN in combination with one or more other factors and/or data points that are used by a fraud detection model of a card issuer (e.g., and applied by the transaction processing system).

When the transaction card performs tokenization of an actual PAN of the transaction card and transmits a tokenized PAN to a transaction terminal, the transaction terminal may never receive the actual PAN, thereby improving security and reducing the likelihood of transaction card fraud. For example, a malicious user may only be able to obtain tokenized PANs, and not actual PANs, from the transaction terminal. Furthermore, security may be further improved by placing restrictions on tokenized PANs, such as in the case of a single-use PAN or a multi-use PAN restricted to a single merchant, as described above. In these cases, if a tokenized PAN is compromised (e.g., discovered and/or used by a malicious user), the transaction processing system may decline the transaction, and may provide an alert regarding the compromised tokenized PAN. For example, if a tokenized PAN is used in association with a first merchant, and is later used at a second merchant, the transaction processing system may provide an alert indicating that the first merchant has been compromised.

As indicated above, FIG. 1 is provided as an example. Other examples are possible and may differ from what was described with regard to FIG. 1.

Figure 2:
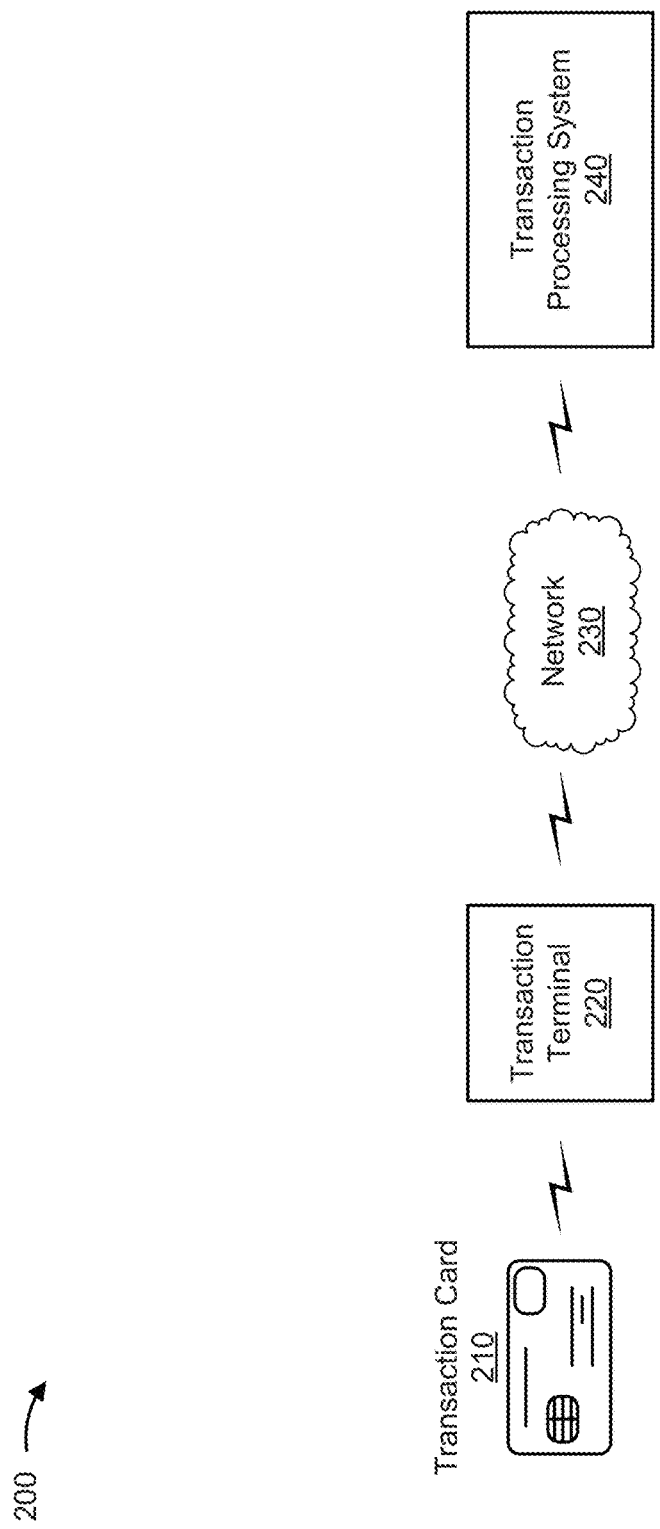
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction card 210, a transaction terminal 220, a network 230, and a transaction processing system 240. In environment 200, transaction card 210 may communicate data associated with or relating to a transaction with transaction terminal 220, which facilitates processing the transaction through communication with transaction processing system 240 via network 230. Devices of environment 200 may interconnect via wired connections, wireless connections, or a combination of wired and wireless connections.

Transaction card 210 includes a transaction card with one or more hardware components and/or one or more hardware and software components (e.g., as described in more detail below in connection with FIG. 3). Transaction card 210 is capable of storing and/or communicating data for a point of sale (PoS) transaction with transaction terminal 220. For example, transaction card 210 may store or communicate data including account information (e.g., an account identifier, a cardholder identifier, an actual PAN, and/or the like), expiration information of transaction card 210, banking information, transaction information (e.g., a payment token), and/or the like. For example, to store or communicate the data, transaction card 210 may include a magnetic strip and/or an integrated circuit (IC) chip (e.g., a EUROPAY®, MASTERCARD®, VISA® (EMV) chip, or the like). In some implementations, transaction card 210 may include software (e.g., an application, an applet, and/or the like), executing on hardware, to perform one or more processes described herein.

In some implementations, transaction card 210 may include an antenna to communicate data associated with transaction card 210. The antenna may be a passive radio frequency (RF) antenna, an active RF antenna, a boosted RF antenna, a battery-assisted RF antenna, and/or the like. In some implementations, transaction card 210 may be a smart transaction card, capable of communicating wirelessly (e.g., via Bluetooth, Bluetooth Low Energy (BLE), near-field communication (NFC), and/or the like) with a computing device, such as transaction terminal 220, a digital wallet, and/or another device. In some implementations, transaction card 210 may communicate with transaction terminal 220 to complete a transaction (e.g., based on being moved within communicative proximity of transaction terminal 220). In some implementations, transaction card 210 may store sensitive data, such as an actual PAN of the transaction card 210 and/or one or more payment credential, in a secure storage component (e.g., a secure element and/or the like) of transaction card 210.

Transaction terminal 220 includes one or more devices capable of receiving, generating, storing, processing, and/or providing information associated with facilitating a transaction (such as a PoS transaction). For example, transaction terminal 220 may include a communication device and/or computing device capable of receiving data from transaction card 210 and/or processing a transaction based on the data. In some implementations, transaction terminal 220 may include a desktop computer, a laptop computer, a tablet computer, a handheld computer, and/or a mobile phone (e.g., a smart phone, a radiotelephone, etc.). Transaction terminal 220 may be owned and/or operated by one or more individuals or businesses engaged in a sale of goods or services (e.g., one or more merchants, vendors, service providers, and/or the like).

Transaction terminal 220 may include one or more devices to facilitate processing a transaction via transaction card 210. Transaction terminal 220 may include a PoS terminal, a security access terminal, an automatic teller machine (ATM) terminal, and/or the like. Transaction terminal 220 may include one or more input devices and/or output devices to facilitate obtaining transaction card data from transaction card 210 and/or interaction or authorization from a cardholder of transaction card 210. Example input devices of transaction terminal 220 may include a number keypad, a touchscreen, a magnetic strip reader, a chip reader, and/or an RF signal reader. A magnetic strip reader of transaction terminal 220 may receive transaction card data as a magnetic strip of transaction card 210 is swiped along the magnetic strip reader. A chip reader of transaction terminal 220 may receive transaction card data from an IC chip (e.g., an EMV chip) of transaction card 210 when the chip is placed in contact with the chip reader. An RF signal reader of transaction terminal 220 may enable contactless transactions from transaction card 210 by obtaining transaction card data wirelessly from transaction card 210 as transaction card 210 comes within a range of transaction terminal 220 that the RF signal reader may detect an RF signal from an RF antenna of transaction card 210. Example output devices of transaction terminal 220 may include a display device, a speaker, a printer, and/or the like.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction processing system 240 includes one or more devices capable of authorizing and/or facilitating a transaction. For example, transaction processing system 240 may include one or more servers and/or computers to store and/or provide information (e.g., authorizations, balances, payment tokens, security information, account information, and/or the like) associated with processing a transaction via transaction terminal 220.

Transaction processing system 240 may include one or more devices associated with banks and/or transaction card associations that authorize the transaction and/or facilitate a transfer of funds or payments between an account of a cardholder of transaction card 210 and an account of an individual or business of transaction terminal 220. For example, transaction processing system 240 may include one or more devices of one or more issuing banks associated with a cardholder of transaction card 210, one or more devices of one or more acquiring banks (or merchant banks) associated with transaction terminal 220, and/or one or more devices associated with one or more card associations (e.g., VISA®, MASTERCARD®, and/or the like) associated with transaction card 210. Accordingly, in response to receiving transaction card data associated with transaction card 210 from transaction terminal 220, various banking institutions and/or card associations of transaction processing system 240 may communicate to authorize the transaction and/or transfer funds between the accounts associated with transaction card 210 and/or transaction terminal 220.

Transaction processing system 240 may include one or more devices associated with security that may provide or deny authorization associated with the transaction. For example, transaction processing system 240 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with transaction card 210 and/or provided by transaction terminal 220.

Transaction processing system 240 may include one or more devices associated with a rewards program with transaction card 210 and/or an entity (e.g., a bank, a merchant, a service provider, a vendor, and/or the like) associated with the transaction card 210 and/or transaction terminal 220 and/or an entity associated with transaction terminal 220. For example, transaction processing system 240 may authorize the earning and/or redemption of rewards (e.g., rewards points associated with transaction card 210, cash rewards, client loyalty rewards associated with an entity associated with transaction terminal 220, and/or the like) based on a transaction processed by transaction terminal 220 with transaction card 210.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
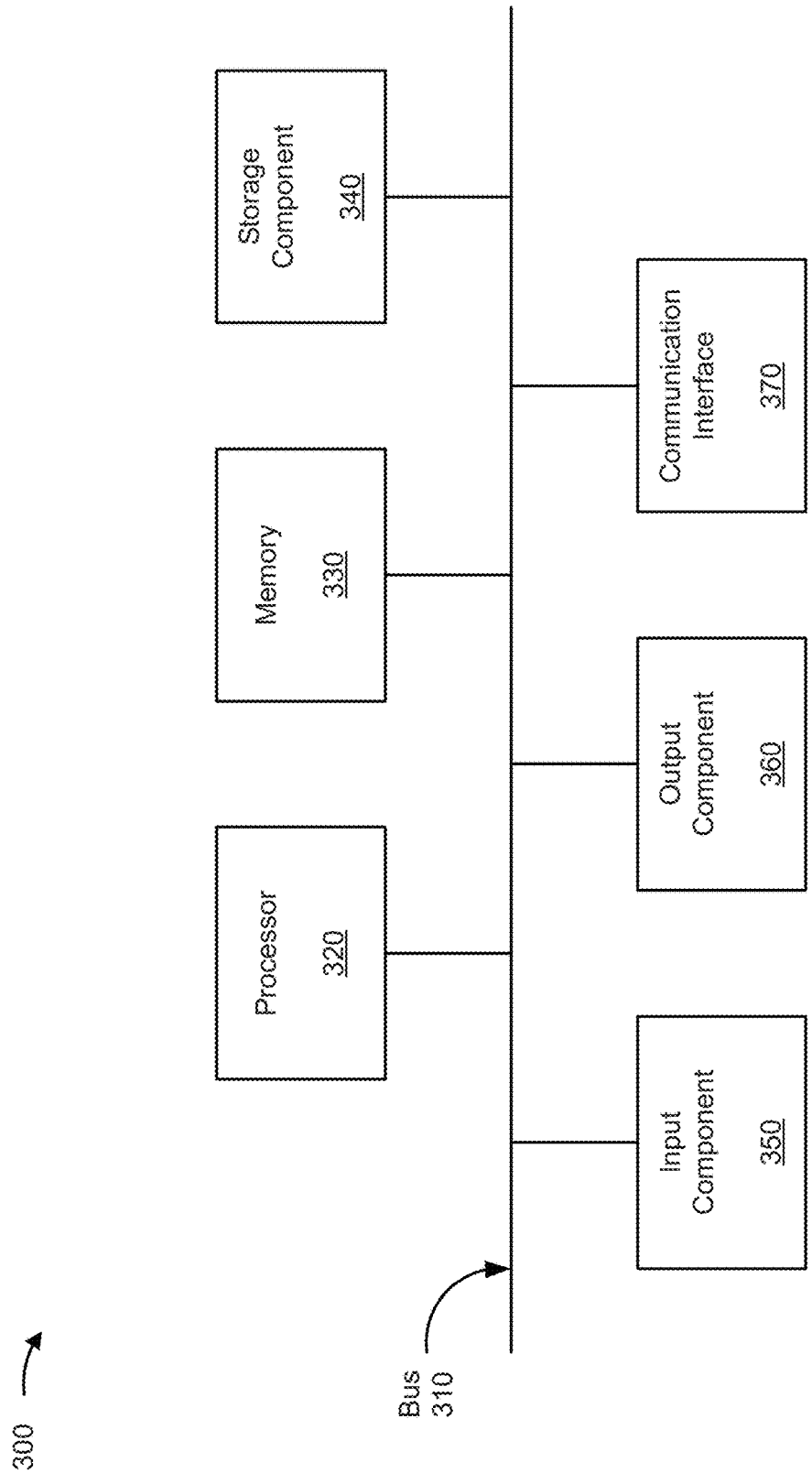
FIG. 3 is a diagram of example components of one or more devices of FIG. 2.

FIG. 3 is a diagram of example components of a device 300. Device 300 may correspond to transaction card 210, transaction terminal 220, and/or transaction processing system 240. In some implementations, transaction card 210, transaction terminal 220, and/or transaction processing system 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), a secure element, and/or another type of dynamic or static storage device (e.g., a magnetic memory, an optical memory, and/or the like) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, a flash memory, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices. In some implementations, device 300 may include a secure element (e.g., a secure microcontroller), which may include a memory 330 (e.g., RAM, ROM, and/or the like) and a storage component 340 (e.g., flash memory, EEPROM, and/or the like). Additionally, or alternatively, the secure element may include one or more processors 320.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 relating to tokenizing a primary account number prior to transmission to a terminal. In some implementations, one or more process blocks of FIG. 4 may be performed by a transaction card (e.g., transaction card 210).

As shown in FIG. 4, process 400 may include receiving a merchant code from a transaction terminal based on initiation of a transaction with the transaction terminal (block 410). For example, the transaction card (e.g., using processor 320, input component 350, communication interface 370, and/or the like) may receive a merchant code from a transaction terminal based on initiation of a transaction with the transaction terminal, as described above in connection with FIG. 1.

As further shown in FIG. 4, process 400 may include generating a tokenized primary account number, for use with the transaction, based on the merchant code and an actual primary account number of the transaction card (block 420). For example, the transaction card (e.g., using processor 320, memory 330, and/or the like) may generate a tokenized primary account number, for use with the transaction, based on the merchant code and an actual primary account number of the transaction card, as described above in connection with FIG. 1.

As further shown in FIG. 4, process 400 may include transmitting the tokenized primary account number and one or more payment credentials to the transaction terminal for performing the transaction (block 430). For example, the transaction card (e.g., using processor 320, output component 360, communication interface 370, and/or the like) may transmit the tokenized primary account number and one or more payment credentials to the transaction terminal for performing the transaction, as described above in connection with FIG. 1.

Process 400 may include additional implementations, such as any single implementation or any combination of implementations described below and/or in connection with one or more other processes described elsewhere herein.

In some implementations, the tokenized primary account number is generated based on at least one payment credential of the one or more payment credentials. In some implementations, the at least one payment credential includes at least one of an expiration date associated with the transaction card, a card security code associated with the transaction card, a cardholder name associated with the transaction card, a billing postal code associated with the transaction card, one or more fields of a billing address associated with the transaction card, or a personal identification number associated with the transaction card.

In some implementations, the tokenized primary account number is generated based on transaction data associated with the transaction. In some implementations, the transaction data includes at least one of a transaction amount, a transaction date, a transaction time, or a transaction location. In some implementations, the tokenized primary account number is a multi-use tokenized primary account number generated using information that does not change across transactions. In some implementations, the tokenized primary account number is a single-use tokenized primary account number generated using information that changes across transactions. In some implementations, the tokenized primary account number is generated to tokenize a portion of the actual primary account number.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 relating to tokenizing a primary account number prior to transmission to a terminal. In some implementations, one or more process blocks of FIG. 5 may be performed by a transaction card (e.g., transaction card 210).

As shown in FIG. 5, process 500 may include receiving transaction data from a transaction terminal based on initiation of a transaction with the transaction terminal (block 510). For example, the transaction card (e.g., using processor 320, input component 350, communication interface 370, and/or the like) may receive transaction data from a transaction terminal based on initiation of a transaction with the transaction terminal, as described above in connection with FIG. 1.

As further shown in FIG. 5, process 500 may include generating a tokenized primary account number, for use with the transaction, based on the transaction data and an actual primary account number of the transaction card (block 520). For example, the transaction card (e.g., using processor 320, memory 330, and/or the like) may generate a tokenized primary account number, for use with the transaction, based on the transaction data and an actual primary account number of the transaction card, as described above in connection with FIG. 1.

As further shown in FIG. 5, process 500 may include transmitting the tokenized primary account number to the transaction terminal for processing the transaction (block 530). For example, the transaction card (e.g., using processor 320, output component 360, communication interface 370, and/or the like) may transmit the tokenized primary account number to the transaction terminal for processing the transaction, as described above in connection with FIG. 1.

Process 500 may include additional implementations, such as any single implementation or any combination of implementations described below and/or in connection with one or more other processes described elsewhere herein.

In some implementations, the transaction data includes at least one of a merchant code, a transaction amount, a transaction date, a transaction time, or a transaction location. In some implementations, the tokenized primary account number is generated based on a payment credential transmitted to the transaction terminal for processing the transaction. In some implementations, the payment credential includes at least one of an expiration date associated with the transaction card, a card security code associated with the transaction card, a cardholder name associated with the transaction card, a billing postal code associated with the transaction card, one or more fields of a billing address associated with the transaction card, or a personal identification number associated with the transaction card. In some implementations, the tokenized primary account number is one of: a multi-use tokenized primary account number generated using a portion of the transaction data that does not change across transactions, or a single-use tokenized primary account number generated using a portion of the transaction data that changes across transactions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 relating to tokenizing a primary account number prior to transmission to a terminal. In some implementations, one or more process blocks of FIG. 6 may be performed by a transaction processing system (e.g., transaction processing system 240).

As shown in FIG. 6, process 600 may include receiving, from a transaction terminal, a tokenized primary account number generated by a transaction card, one or more payment credentials associated with the transaction card, a merchant code, and transaction data associated with a transaction (block 610). For example, the transaction processing system (e.g., processor 320, input component 350, communication interface 370, and/or the like) may receive, from a transaction terminal, a tokenized primary account number generated by a transaction card, one or more payment credentials associated with the transaction card, a merchant code, and transaction data associated with a transaction, as described above in connection with FIG. 1.

As further shown in FIG. 6, process 600 may include determining an actual primary account number of the transaction card based on the tokenized primary account number and the merchant code (block 620). For example, the transaction processing system (e.g., processor 320 and/or the like) may determine an actual primary account number of the transaction card based on the tokenized primary account number and the merchant code, as described above in connection with FIG. 1.

As further shown in FIG. 6, process 600 may include determining whether the transaction is authorized based on the actual primary account number and the one or more payment credentials (block 630). For example, the transaction processing system (e.g., processor 320, memory 330, storage component 340, input component 350, output component 360, communication interface 370, and/or the like) may determine whether the transaction is authorized based on the actual primary account number and the one or more payment credentials, as described above in connection with FIG. 1.

As further shown in FIG. 6, process 600 may include transmitting, to the transaction terminal, a result of determining whether the transaction is authorized (block 640). For example, the transaction processing system (e.g., processor 320, output component 360, communication interface 370, and/or the like) may transmit, to the transaction terminal, a result of determining whether the transaction is authorized, as described above in connection with FIG. 1.

Process 600 may include additional implementations, such as any single implementation or any combination of implementations described below and/or in connection with one or more other processes described elsewhere herein.

In some implementations, the actual primary account number is determined based on at least one of information included in the transaction data or a payment credential of the one or more payment credentials. In some implementations, the transaction processing system, when determining whether the transaction is authorized, is configured to compare the tokenized primary account number to a list of tokenized primary account numbers stored in the one or more memories. In some implementations, the transaction processing system, when determining whether the transaction is authorized, is configured to decline the transaction when the tokenized primary account number has been previously used within a threshold time period. In some implementations, the transaction processing system is configured to transmit a notification that the tokenized primary account number has been previously used within the threshold time period.

In some implementations, the transaction processing system, when determining whether the transaction is authorized, is configured to decline the transaction when the tokenized primary account number has been previously used in connection with a different merchant code. In some implementations, the transaction processing system is further configured to transmit a notification that the tokenized primary account number has been previously used in connection with a different merchant code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a first device, a tokenized primary account number associated with a transaction with a second device,
wherein the tokenized primary account number is based on initiating the transaction, based on at least two parameters associated with the transaction, and based on an actual primary account number stored on a transaction card associated with the transaction; and
authorizing, by the first device, based on the tokenized primary account number, and based on the actual primary account number, the transaction.

2. The method of claim 1, further comprising:
sending instructions to the transaction card to broadcast location information of the transaction card.

3. The method of claim 1, wherein the tokenized primary account number is generated further based on one or more credentials associated with the transaction card.

4. The method of claim 1, wherein the transaction is authorized further based on one or more credentials associated with the transaction card.

5. The method of claim 1, wherein the second device is a transaction terminal.

6. The method of claim 1, wherein the second device is a mobile phone or a tablet computer.

7. The method of claim 1, wherein the at least two parameters include at least one of:
a merchant code associated with the transaction,
a transaction amount associated with the transaction,
a transaction date associated with the transaction,
a transaction time associated with the transaction, or
a transaction location associated with the transaction.

8. A first device, comprising:
one or more memories; and
one or more processors configured to:
receive a first primary account number associated with a transaction with a second device, wherein the first primary account number is a tokenized primary account number that is based on initiating the transaction, based on at least two parameters associated with the transaction, and based on a second primary account number stored on a transaction card associated with the transaction; and authorize, based on the first primary account number and based on the second primary account number, the transaction.

9. The first device of claim 8, wherein the one or more processors are to:

send instructions to the transaction card to broadcast location information of the transaction card.

10. The first device of claim 8, wherein the first primary account number is generated further based on one or more credentials associated with the transaction card.

11. The first device of claim 8, wherein the transaction is authorized further based on one or more credentials associated with the transaction card.

12. The first device of claim 8, wherein the second device is a transaction terminal.

13. The first device of claim 8, wherein the second device is a mobile phone or a tablet computer.

14. The first device of claim 8, wherein the at least two parameters include at least one of:

a merchant code associated with the transaction,
a transaction amount associated with the transaction,
a transaction date associated with the transaction,
a transaction time associated with the transaction, or
a transaction location associated with the transaction.

15. A non-transitory computer-readable medium storing a set of instructions, the set of instructions comprising:

one or more instructions that, when executed by one or more processors of a first device, cause the first device to:

receive a tokenized primary account number associated with a transaction with a second device,
wherein the tokenized primary account number is based on initiating the transaction, based on at least two parameters associated with the transaction, and based on an actual primary account number stored on a transaction card associated with the transaction; and authorize, based on the tokenized primary account number and based on the actual primary account number, the transaction.

16. The non-transitory computer-readable medium of claim 15, wherein the one or more instructions cause the first device to:

send instructions to the transaction card to broadcast location information of the transaction card.

17. The non-transitory computer-readable medium of claim 15, wherein the tokenized primary account number is generated further based on one or more credentials associated with the transaction card.

18. The non-transitory computer-readable medium of claim 15, wherein the transaction is authorized further based on one or more credentials associated with the transaction card.

19. The non-transitory computer-readable medium of claim 15, wherein the second device is a transaction terminal.

20. The non-transitory computer-readable medium of claim 15, wherein the at least two parameters include at least one of:

a merchant code associated with the transaction,
a transaction amount associated with the transaction,
a transaction date associated with the transaction,
a transaction time associated with the transaction, or
a transaction location associated with the transaction.

* * * * *